(12) United States Patent
Mobbs et al.

(10) Patent No.: US 6,302,952 B1
(45) Date of Patent: Oct. 16, 2001

(54) PROCESS FOR THE PRODUCTION OF BLACK IRON OXIDE PIGMENTS

(75) Inventors: David Barry Mobbs; Matthew James Jackson, both of Cheshire (GB)

(73) Assignee: Laporte Industries Limited, London (GB)

( * ) Notice: Subject to any disclaimer, the term of this patent is extended or adjusted under 35 U.S.C. 154(b) by 0 days.

(21) Appl. No.: 09/581,541

(22) PCT Filed: Jan. 5, 1999

(86) PCT No.: PCT/GB99/00022

§ 371 Date: Aug. 18, 2000

§ 102(e) Date: Aug. 18, 2000

(87) PCT Pub. No.: WO99/37719

PCT Pub. Date: Jul. 29, 1999

(30) Foreign Application Priority Data

Jan. 26, 1998 (GB) .................................... 9801477

(51) Int. Cl.⁷ ............................ C09C 1/24; C01G 49/08; C04B 14/30
(52) U.S. Cl. ........................ 106/456; 423/632; 423/633
(58) Field of Search ............................ 106/456; 423/632, 423/633

(56) References Cited

U.S. PATENT DOCUMENTS

| | | | |
|---|---|---|---|
| 4,348,240 | * 9/1982 | Patil et al. ........................... | 106/456 |
| 4,404,254 | * 9/1983 | Franz et al. ........................... | 428/329 |
| 4,992,191 | * 2/1991 | Mori et al. ........................... | 252/62.59 |
| 5,093,100 | * 3/1992 | Sadamura et al. ................... | 423/632 |
| 5,589,097 | * 12/1996 | Nihira et al. ........................ | 252/62.59 |

FOREIGN PATENT DOCUMENTS

| | | |
|---|---|---|
| 2244716 | 9/1973 | (FR) . |
| 2051027 | 1/1981 | (GB) . |
| 62-252327 | * 11/1987 | (JP) . |
| 4-144924 | * 5/1992 | (JP) . |

* cited by examiner

Primary Examiner—Anthony Green
(74) Attorney, Agent, or Firm—Hoffman, Wasson & Gitler

(57) ABSTRACT

A process for the production of a black iron oxide pigment from $Fe_2O_3$ hematite iron oxide which may be an impure oxide produced by the "Ruthner" process or by other means, or which may be a mineral hematite. The process may be used to upgrade poor quality synthetic or natural hematite, or to improve their performance as red pigments, by conversion to black pigment with subsequent oxidation of the magnetite so produced back to hematite. The process uses a low temperature aqueous slurry reaction in which the hematite is contacted with a soluble source of Fe(II) ions in the presence of a soluble source of Fe(III) ions in an aqueous alkaline medium to convert the same to $Fe_3O_4$.

15 Claims, No Drawings

PROCESS FOR THE PRODUCTION OF BLACK IRON OXIDE PIGMENTS

This invention relates to a process for the production of black iron oxide pigments and, more particularly, to the production of black iron oxide pigment from hematite.

Pigmentary black iron oxide has the formula $Fe_3O_4$ and a cubic crystal structure typical of a magnetite. It may be used, for example, in the pigmentation of building materials such as concrete, mortar, plaster of Paris, roofing tiles, paving bricks, artificial stone products or other similar products.

A great quantity of somewhat impure iron (II) chloride is produced as a by-product in the steel pickling industry and it would be of value to utilise this by-product as a raw material. According to the well known "Ruthner", or "spray-roast", process pickle mill waste aqueous iron chloride is converted into an iron oxide having the formula $Fe_2O_3$ and a hexagonal crystal structure typical of a hematite by a spray-roasting process. The product of such a process and raw material is a red pigment having an appreciable content of chloride and of a wide range of other impurities. Typically this product may contain more than 90% by weight of $Fe_2O_3$, a restricted quantity of FeO, for example from 0.005% to 0.5% by weight, a substantial quantity of chloride ion, for example from 0.002% to 1% of more, possibly up to 5% by weight, an appreciable quantity of $Mn_2O_3$, for example from 0.1% to 1% by weight as well as, usually, oxides of some or all of aluminium, chromium, magnesium, titanium, zinc, lead, copper, arsenic and vanadium and oxides also of calcium silicon and phosphorus and a content of carbon.

It would be a useful contribution to the pigments industry to enable the production of a black iron oxide from a natural or synthetic hematite. However, hematite can be a relatively unreactive material and no aqueous slurry process enabling this has been known. Both natural mineral hematite and synthetic spray-roast hematite have passed through a period of elevated temperature which induces a degree of inertness due to calcination.

French Patent No. 2244716-A of Ruthner Akt. describes the production of a black iron oxide pigment powder from $Fe_2O_3$ prepared by the thermal dissociation of an iron chloride solution by means of a high temperature solid-vapour reaction comprising heat treatment under oxidising, reducing or neutral conditions at a temperature above 400° C. and then heat treatment under reducing conditions at a temperature under 550° C. The product is $Fe_3O_4$ having a magnetite structure containing 0.02% chloride. This product is then ground in a vibratory mill to give a particle size substantially below 0.045 mm.

The present invention provides an alternative process for the production of a black iron oxide pigment from $Fe_2O_3$ hematite iron oxide, which may have been produced by the "Ruthner" process or by other means, or which may be a mineral hematite. The process may be used to reconvert poor quality synthetic or natural hematites to black iron oxide or to improve their performance as red pigments by conversion to black pigment and subsequent oxidation of the magnetite so produced back to hematite. The process of the present invention uses a low temperature aqueous slurry reaction.

The present invention provides a process for the production of black iron oxide pigment from iron oxide having the hematite crystal structure the process being characterised in that the hematite is contacted with a soluble source of Fe(II) ions in the presence of a soluble source of Fe(III) ions and in an aqueous alkaline medium to convert the same to $Fe_3O_4$.

It has been found that the strength of the black pigment may be very considerably enhanced by the introduction of a quantity of a soluble source of Fe(III) ions, for example ferric sulphate, into the aqueous alkaline medium as is shown in Examples 5a to 5C and 6a to 6c below.

In the practice of the invention the iron oxide having a hematite structure is preferably a spray-roast product produced from iron chloride as described above. Such a product will normally be in the form of particles of which at least 50% by weight are at least 5 micrometers, for example from 5 to 20 micrometers in diameter.

The soluble source of Fe(II) ions may be a water soluble iron salt such as the chloride or the sulphate. Preferably the iron salt is iron sulphate which may suitably be in the form of ferrous sulphate heptahydrate, or copperas. The soluble source of Fe(II) ions is suitably included in the reaction mixture as a solution in water, preferably a concentrated solution, for example, in the case of copperas, a solution containing about 450 g/l or up to the solubility limit of copperas at the temperature used. Preferably the quantity of the soluble source of Fe(III) ions is at least 1 g/l and, for example up to 20 g/l of the soluble source of Fe(II) ions or an equivalent quantity.

The alkalinity of the medium may suitably be provided by a base such as ammonium hydroxide or sodium carbonate but is preferably an alkali metal hydroxide such as sodium hydroxide. As a general procedure for carrying out the invention the hematite may be suspended in water using a suitable degree of agitation, and if required a suspending agent, the Fe(II) compound may be added to the suspension in the form of an aqueous solution or may be added as a solid and dissolved in situ, the reaction mixture may be heated to reaction temperature, the base may then be added and the resulting reaction mixture may be maintained for a period to allow the reaction to proceed and the required crystal habit to form.

In a standard process according to the invention the initial solids concentration of the hematite may suitably be from 50 to 150 g/l, the temperature of the reaction mixture may suitably be maintained at, at least, 60° C., and suitably below the boiling temperature at ambient pressure, but preferably from 70° C. to 100° C., the agitation may suitably be by stirring at a rotor tip speed of at least 0.3 m/sec., suitably up to 3.5 m/sec., but preferably from 0.5 to 2 m/sec. the ratio of Fe(II)/FE(III), that is the ratio of soluble Fe(II) to the Fe(III) content of the hematite, may suitably be at least 0.25, suitably up to 1, the content of added source of soluble Fe(III) ions in the aqueous medium is at least 5 g/l, the base may suitably be introduced over from 1 minute to 60 minutes but preferably over 5 to 30 minutes, the base may suitably be in the form of an at least 100 g/l, suitably up to 600 g/l solution, the pH may suitably be at least 7.5, suitably up to 11 but preferably below 9.0 for example below 8.75, to augment the black strength of the pigment and the reaction mixture may suitably be maintained for from 2 to 24 hours after the addition of the base.

In order to enhance the pigmentary properties of the product of this invention the following process features thereof are preferably employed, individually or in any combination.

It has been found that the strength of the black pigment may be enhanced by controlling the particle size of the hematite. Preferably, the particle size is controlled at at least 97% by weight below 15, particularly preferably below 10 micrometers in diameter. Preferably at least 90% by weight of the particles are below 10, particularly preferably below 5 micrometers in diameter. Preferably at least 10% by weight of the particles are below 0.75, particularly preferably below 0.5 micrometers in diameter. This feature is illustrated in Examples 3a, 3b and 3c hereafter.

It has also been found that the black strength of the pigment may be enhanced by closely controlling the Fe(II)/Fe(III) ratio defined above. Preferably, the ratio is from 0.4 to 0.55, particularly preferably 0.45 to 0.55 suitably 0.5+/−0.025. This feature is illustrated in Examples 6a to 6c hereafter.

It has also been found that the strength of the black pigment may be enhanced by the addition of a suspending agent to the aqueous alkaline medium before or after the suspension of the oxide having the hematite crystal structure is formed or to the oxide itself. Preferably the suspending agent is a phosphate such as, for example, a phosphoric acid, or salt thereof, or a poly- or pyrophosphate. Preferably the phosphate is added in at least 50, suitably up to 250, mg/l of the aqueous alkaline medium. A particularly suitable phosphate is ortho-phosphoric acid. This feature is illustrated in Example 6c hereafter.

It has also been found that the strength of the black pigment may be enhanced, when a hematite derived by the roasting of iron chlorides is used as the starting material, by using a hematite having an initially high free iron(II) chloride content even though the said chloride content is reduced prior to processing according to the invention to reduce corrosiveness towards processing equipment. Such an initial content of iron (II) chloride may be, for example, at least 25, preferably at least 50, and for example up to 150 g/kg, expressed as Cl—. The iron (II) may be reduced by precipitation as the hydroxide by means of a dilute alkali wash and the chloride removed by decantation or other removal of the mother liquor. The precipitated iron hydroxide may stay with the hematite during the further processing according to the invention. The invention does not exclude the possibility that the presence of the iron hydroxide may itself be the beneficial feature and the preference for a high chloride content in the starting hematite is therefore expressed herein, in the alternative, as a preference for the corresponding content of iron hydroxide, for example at least 10 g/kg expressed as the hydroxyl ion, in the hematite without, necessarily, any limitation to a particular source of the iron hydroxide. Preferably the residual chloride content of the iron oxide is not more than 0.1 for example from 0.01 to 0.8 g/l of the suspension. This feature is illustrated in Examples 4a, 4b and 4c hereafter.

Although the process described herein is mainly envisaged for the production of a black pigment, the magnetite product may in turn be used to prepare red pigment, i.e. hematite, by thermal or hydrothermal oxidation. The invention does not exclude the use of the product iron oxides in applications in which non-pigmentary properties are availed of, for example magnetic properties, and the scope of protection of the claims attached hereto should be construed accordingly.

The strength and colour tone of black iron oxide pigment may be assessed by known test methods with the results expressed using the CIELAB colour system by the colour coordinates $L^*$, $a^*$ and $b^*$. The $L^*$ coordinate expresses the black strength of the pigment on a scale of 0 to 100 with the lower values indicating the stronger black tone. References herein to the strength of black pigment are intended to refer to the value of the $L^*$ coordinate. The $a^*$ coordinate expresses the red/green tone of the pigment with the higher values indicating stronger red tone and lower values indicating stronger green tone. The $b^*$ coordinate expresses the yellow/blue tone of the pigment with the higher values indicating stronger yellow tone and lower values indicating stronger blue tone. In the case of a strong black iron oxide pigment the $L^*$ coordinate may lie in the approximate range of 50 to 60 and the $a^*$ and $b^*$ coordinates may lie in the approximate range of 0 to 10.

The invention according to the invention is be illustrated by means of the following Examples 1 to 6 which are repetitions of the process of the present invention using varied procedural features.

The colour coordinates were determined by milling a standard mixture of the test pigment with a white Portland Cement, tabletting the mixture and measuring the surface reflectance using a Minolta CM-5081 spectrophotometer. Examples 1 to 5 used identical test procedures but Example 6 used a slightly different test procedure and, while the results are internally consistent within that Example, they are not precisely comparable with those of Examples 1 to 5.

So that a comparison may be made with commercially available black iron oxide pigments the colour coordinates of commercial pigments, namely Bayferrox 330 from Bayer AG and Duploxide 77 from Silo SpA, were determined by the method of Examples 1 to 5 and, in the case of the latter pigment, also by the method of Example 6. Bayferrox 330 and Duploxide 77 are Trade Names. The results of these tests were as follows:

METHOD OF EXAMPLES 1 to 5

|  | $L^*$ | $a^*$ | $b^*$ |
| --- | --- | --- | --- |
| Bayferrox 330 | 55.1 | 2.0 | 4.8 |
| Duploxide 77 | 53.2 | 1.8 | 4.4 |
| Method of Example 6. |  |  |  |
| Duploxide 77 | 53.3 | 0.14 | 2.88 |

In Example 1 a standard preparation was used in which a suspension of iron oxide having a hematite crystal structure, produced by a spray-roast process from steel etching waste ferrous chloride and having the particle size distribution of at least 90% by weight below 20 microns was prepared at a concentration of 95 g/l and held in suspension by stirring at a rotor tip speed of 1.57 m/s (500 rpm) at a temperature of 92° C. Ferrous sulphate heptahydrate was added as a solution having a concentration of 450 g/l to give a Fe(II) to Fe(III) ratio of 0.49. NaOH was added over an addition time of 10 minutes at a concentration of 400 g/l to give a pH of 8 to 8.2. After the addition of the NaOH the reaction mixture was held at the same temperature for a further period of time of at least 4 hours. The product of this standard preparation gave the colour coordinates $L^*$ 57.8, $a^*$ 2.8 and $b^*$ 4.8.

In Example 2 the rotor tip speed was increased to 2.82 m/s (900 rpm) and the colour coordinates were $L^*$ 56.2, $a^*$ 3.1 and $b^*$ 4.9.

It is seen that increasing the agitation energy reduced the $L^*$ coordinate of the product.

In Examples 3a to 3c the hematite iron oxide was unmilled, was dry milled using a Circoplex (Trade Mark) mill and was wet milled using a Discoplex (Trade Mark) mill. The size distributions of these iron oxides were at least 90% by weight under 20 microns for the unmilled oxide and at least 90% by weight under 10 microns for the milled oxides. After the addition of the NaOH the reaction mixtures were held at the same temperature for 4 hours for the unmilled iron oxide [Ex.3(a)], 4 hours 15 minutes for the dry milled iron oxide and only 2 hours 50 minutes for the wet milled iron oxide. The colour coordinates given by the products of these Examples were:

| Example | L* | a* | b* |
|---|---|---|---|
| 3a | 56.7 | 1.5 | 4.0 |
| 3b | 52.6 | 1.4 | 2.2 |
| 3c | 51.5 | 1.8 | 3.4 |

It is seen that milling, and particularly wet milling, gave a considerable reduction of the L* coordinate.

In Example 4a to 4c hematites having different contents of free $FeCl_2$ were used, as indicated indirectly by the amount of chloride removed. The chloride was removed by precipitating the iron (II) using excess dilute NaOH and removing the chloride by decantation.

| Example | $FeCl_2$ removed g $Cl^-$/Kg $Fe_2O_3$ | L* | a* | b* |
|---|---|---|---|---|
| 4a | 4.9 | 56.7 | 1.1 | 1.5 |
| 4b | 10.7 | 54.8 | 1.3 | 2.5 |
| 4c | 78.0 | 52.6 | 1.6 | 3.9 |

It is seen that the more $FeCl_2$ removed, i.e. the more initially present, the more the L* coordinate is reduced.

In examples 5a to 5c there is an increasing quantity of soluble Fe(III) in the solution of copperas.

| Example | Fe(III) content g/l | L* | a* | b* |
|---|---|---|---|---|
| 5a | Trace (<0.1) | 60.3 | 1.1 | 0.2 |
| 5b | 1.9 | 55.1 | 1.3 | 1.4 |
| 5c | 10.6 | 52.8 | 1.7 | 3.6 |

It is seen that the use of a Fe(II) solution containing a higher quantity of Fe(III) reduced the L* coordinate, that is, increased the black strength of the pigment product.

In Examples 6a and 6b a standard preparation was conducted using spray-roast hematite, copperas as a source of Fe(II), a stirring rotor tip speed of 0.8 m/sec., a reaction temperature of 92° C. and a reaction time of two hours. The other process parameters are as follows:

| | Example No. | | |
|---|---|---|---|
| Parameter | 6a | 6b | 6c |
| Overall Fe(II)/Fe(III) | 0.49 | 0.50 | 0.50 |
| $Fe_2O_3$ Concn. g/l | 95.0 | 95.0 | 95.0 |
| $FeSO4.7H2O$ concn. g/l | 432 | 432 | 426 |
| Fe(III) in copperas g/l | 2.9 | 6.2 | 6.5 |

In Examples 6a, 6b and 6c the hematite was wet milled a size of at least 90% under 5 microns. In Examples 6b and 6c an increased quantity of Fe(III) in the solution of the source of Fe(II) was used. In Example 6c 100 mg/l of orthophosphoric acid was added to the $Fe_2O_3$.

The products of these Examples gave the following colour coordinates:

| Example No. | L* | a* | b* |
|---|---|---|---|
| 6a | 56.39 | −0.12 | 0.78 |
| 6b | 55.82 | 0.25 | 1.06 |
| 6c | 54.12 | 0.72 | 2.48 |

What is claimed is:

1. A process for production of black iron oxide ($Fe_3O_4$) pigment from iron oxide having a hematite crystal structure comprising contacting a hematite with a soluble source of Fe(II) ions in the presence of a soluble source of Fe(III) ions in an aqueous alkaline medium to convert said hematite to $Fe_3O_4$.

2. The process as claimed in claim 1, wherein a ratio of soluble Fe(II) to Fe(III) content of the hematite is at least 0.25.

3. The process as claimed in claim 1, wherein at least 1 g/l of a soluble source of Fe(III), based on the quantity of the soluble source of Fe(II), is present.

4. The process as claimed in claim 1, wherein the soluble source of Fe(II) ions is included in the aqueous alkaline medium as a solution of copper as having a concentration of from 450 g/l to a solubility limit.

5. The process as claimed in claim 1, wherein the iron oxide having the hematite crystal structure is milled before incorporation in the aqueous alkaline medium.

6. The process as claimed in claim 5, wherein a particle size distribution of the milled iron oxide is at least 90% by weight under 10 microns.

7. The process as claimed in claim 1, wherein a suspension stabilizer is included in the iron oxide having the hematite crystal structure.

8. The process as claimed in claim 7, wherein the stabilizer is a phosphate stabilizer.

9. The process as claimed in claim 8, wherein the phosphate stabilizer is present in at least 50 mg/l of the alkaline aqueous medium.

10. The process as claimed in claim 1, wherein the iron oxide having the hematite crystal structure is agitated by stirring at a rotor tip speed of more than 0.3 m/second and up to 2 m/second during addition of the aqueous alkaline medium.

11. The process as claimed in claim 1, wherein the iron oxide having the hematite crystal structure is treated to reduce a content of chloride therein and in the aqueous alkaline medium.

12. The process as claimed in claim 11, wherein the reduced chloride content is less than 0.1 g/l of the aqueous alkaline medium.

13. The process as claimed in claim 11, wherein the iron oxide having the hematite crystal structure has an initial content of iron(II) chloride of at least 25 g/kg.

14. The process as claimed in claim 1, wherein the iron oxide having the hematite structure contains iron hydroxide in at least 10 g/kg, expressed as a hydroxide ion.

15. A process for production of red iron oxide having a hematite crystal structure, wherein the $Fe_3O_4$ pigment is produced from iron oxide having a hematite crystal structure comprising the steps of contacting a hematite with a soluble source of $Fe_2$ ions in the presence of a soluble source of $Fe_3$ ions in an aqueous alkaline medium to convert the hematite to $Fe_3O_4$, and wherein the $Fe_3O_4$ is then oxidized by thermal or hydrothermal oxidation.

* * * * *